A. T. BROOKS.
Door Bell.

No. 79,308. Patented June 30, 1868.

Witnesses:
N. C. Wilder
Jeremy W Bled

Inventor:
Asa T. Brooks

United States Patent Office.

ASA T. BROOKS, OF NEW BRITAIN, CONNECTICUT.

Letters Patent No. 79,308, dated June 30, 1868.

---

IMPROVEMENT IN DOOR-BELLS.

---

*The Schedule referred to in these Letters Patent and making part of the same.*

---

TO ALL WHOM IT MAY CONCERN:

Be it known that, I, ASA T. BROOKS, of New Britain, county of Hartford, and State of Connecticut, have invented certain new and useful Improvements in the Manufacture of Call-Bells; and to enable others skilled in the art to make and use the same, I will proceed to describe its construction and operation, by referring to the drawings, in which the same letters indicate like parts in each of the figures.

The nature of this invention will be understood from the specification and drawings.

In the accompanying drawings—

Figure 1:
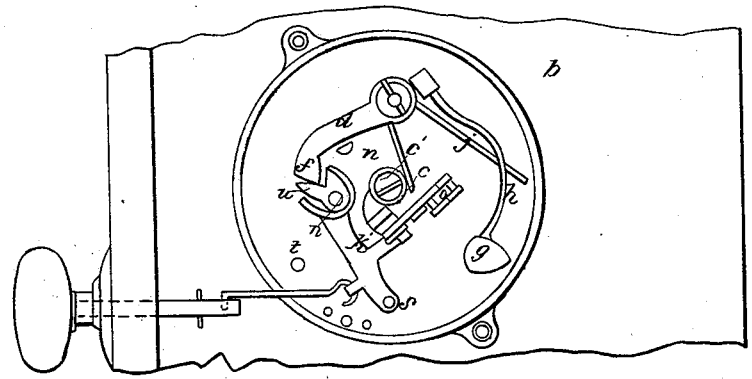
Figure 1 is a face view of the mechanism arranged upon the fastening-plates, with the bell removed, which, when in place, is secured to the stud $c$ by a screw, $c'$, and covers the mechanism from view.
Figure 2:
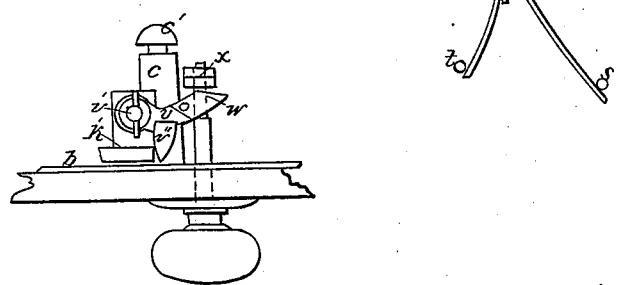
Figure 2 is a view of a portion of the mechanism, showing how it (the mechanism) is actuated by a pull or spindle working in a line at right angle with the fastening-plate.

$b$ is the fastening-plate, to which the mechanism is secured. $c$ is a stud, to which the bell is secured in the usual way. $d$ is an arm, which actuates the hammer, secured and oscillated upon a stud-pin, $e$. This arm $d$ is provided with a V-shaped projection, $f$. The hammer is made on or secured by its arm, $h$, to the arm $d$, at $i$, (or other desirable point.) $z$ is a coil-spring, secured upon the stud-pin $e$, one end of which bears against the stud $c$, and the other against the hammer-arm. $k$ is an actuating-arm, secured by its hub between the plates $b$ and $m$, or upon a stud-pin, $n$. $o$ is a coil-spring, secured upon the hub of the arm $k$, the extended ends of which cross and pass by the side of a stump, $p$, formed on or near the outer end of the arm $k$, and take their bearings, one on one side, and the other on opposite side of the stud $q$, thus producing a double action of the spring upon the arm $k$. The hub of this arm is also provided with an orifice, for the reception of the crank or knob-spindle $a$, by which it is actuated. The actuating-arm $k$ is secured upon a stud-pin, $n$, and is reacted and held in a fixed position for action by a coil-spring, $o'$, secured upon the pin $n$, one arm of which rests against a stump, $s$, upon the arm $k$, and the other against the stump $t$. Upon these arms $k$ $k'$ are arranged one or more vibrating trip-cams $u$, which act against, first, one side, then the other of the V-shape projection $f$, on the arms $d$, the result of which is to produce a double and an accelerated action of the hammer each pull or vibration of the spindle.

$r$ is an angular crank or lever, suspended, or has its oscillating bearing on a pin, $v'$, which is secured in or near the body of the bell-stud $c$. One prong of said angle-lever $v''$ extends down, and takes bearing against the side of the arm $k'$. The other end, $w$, is made $\wedge$-shape, and in one or two parts, so that it may pass through a slit in the pull-spindle, or so that the pull-spindle may pass between the two parts, and the pad $x$ take its bearing upon the $\wedge$-shape formation $w$, so that, when the knob-spindle is pulled, the pad $x$ will act upon the $\wedge$-shape end $w$ of the angle-lever, and through the arm $v''$.

Arm $k$ actuates the hammer, and causes it to make two strokes each pull of the knob.

Each of the levers $k$ $k'$ is provided with an eye, in which to secure a wire, running in a direction parallel with the plate $f$, for the purpose of forming a connection with the pull-spindle.

Thus I am enabled to produce a quick, double, easy, and distinct action, by one turn to the right or left, or one pull of the knob or vibratory crank, either in a line at right angle, or parallel with the plate $b$.

I believe I have thus shown the nature, construction, and advantage of this invention, so as to enable others skilled in the art to make and use the same therefrom.

What I claim, therefore, and desire to secure by Letters Patent, is—

1. An oscillating-arm, $k'$, and vibratory cam $u$, secured and oscillating both upon the same stud-pin $n$, in combination with the arms $d$ $k$, substantially as described.

2. In combination with the above, the angle-lever $v$, oscillating upon the pin $v'$, all arranged and operating substantially as and for the purpose described.

ASA T. BROOKS.

Witnesses:
  N. C. WILDER,
  JEREMY W. BLISS.